United States Patent [19]
Dorffler et al.

[11] Patent Number: 5,509,354
[45] Date of Patent: * Apr. 23, 1996

[54] IGNITER HOLDER

[75] Inventors: Michael K. Dorffler, Canon City; Ronald L. McClaren, Pueblo, both of Colo.

[73] Assignee: Centuri Corporation, Penrose, Colo.

[*] Notice: The portion of the term of this patent subsequent to Mar. 7, 2014, has been disclaimed.

[21] Appl. No.: 207,352

[22] Filed: Mar. 7, 1994

Related U.S. Application Data

[63] Continuation-in-part of Ser. No. 973,769, Nov. 9, 1992, abandoned, which is a continuation-in-part of Ser. No. 858,109, Mar. 26, 1992, abandoned.

[51] Int. Cl.⁶ .................................................. F42C 19/12
[52] U.S. Cl. ................. 102/202; 102/202.9; 102/202.11; 60/39.823; 60/256
[58] Field of Search ............................ 102/202, 202.9, 102/202.11, 275.12; 60/39.823, 256, 39.827, 253, 255, 39.821

[56] References Cited

U.S. PATENT DOCUMENTS

| | | | |
|---|---|---|---|
| 2,720,749 | 10/1955 | Beebe, Jr. ................................ | 60/256 |
| 2,776,623 | 1/1957 | Bonner ................................... | 102/202 |
| 2,796,024 | 6/1957 | Swaim ................................ | 102/275.12 |
| 3,020,710 | 2/1962 | Herzog ................................... | 60/256 |
| 3,121,310 | 2/1964 | Rice ........................................ | 60/253 |
| 3,166,979 | 1/1965 | Draim ..................................... | 60/256 |
| 3,226,928 | 1/1966 | Webb et al.° ........................... | 60/253 |
| 3,248,873 | 5/1966 | Pase ..................................... | 60/39.823 |
| 3,251,267 | 5/1966 | Hauser et al. .......................... | 60/256 |

(List continued on next page.)

FOREIGN PATENT DOCUMENTS

| | | | |
|---|---|---|---|
| 1257603 | 2/1961 | France ................................... | 60/256 |
| 2151495 | 4/1973 | France ................................... | 102/202 |
| 1181494 | 11/1964 | Germany ................................ | 60/256 |
| 500820 | 10/1954 | Italy ....................................... | 102/202 |

OTHER PUBLICATIONS

Aviation Age, Ignition Systems, Sep. 1957, p. 59.
"Cox Model Rocket Engines: Instructions," L. M. Cox Manufacturing. (2 pages) (no date).
"Model Rocketry Technical Manual," Estes Industries. (2 pages) (no date).
"Rocket Motors With Tiger Tail II Igniters: Instructions and Safety Information" (Pamphlet), Quest Aerospace Education Inc. (2 pages) (no date).
"Starbird: Flying Model Rocket" (Brochure), Estes Industries.
"1992 Flying Model Rocket Catalog: 22 All New Kits and Accessories," Estes Industries, p. 62, 1992.
"Educator Catalog: Ignite The Imagination Through Learning," Selecting the Proper Rocket Engine, Estes Educator Industry, p. 9, 1992.
"Flip Chart and Reproduction Masters," Igniter Plug Technology (Brochure) Estes Educator Industry, No. 8405, p. 11, 1992.
"Model Rocket News," Estes Industries, vol. 31, No. 2, Issue 91, p. 14, Winter 1992.
"News," Estes Educator, vol. 17, No. 2, p. 8, Fall 1992.
"Hobby Merchandiser," Trade Magazine, pp. 1–2, 13, 20, 25, 63–64, 79, 81, 100: Jul. 1992.
"Model Rocket News," Estes Industries, p. 10, Summer 1992.
"News," Estes Educator, vol. 17, No. 1, p. 9, Spring 1992.
"1991: Flying Model Rocket Catalog," Estes Industries, pp. 2–3, 1991.
"Composite Model Rocket Motor: Instructions," AeroTech, Inc., 1989.
"Model Rocketry: The Classic Collection" (Catalog), Estes Industries, pp. 3–6, 21–24, 28–29, 1988.

*Primary Examiner*—Stephen M. Johnson
*Attorney, Agent, or Firm*—Lahive & Cockfield

[57] ABSTRACT

An igniter holder is designed for use with a model rocket engine for temporarily fixing the igniter in the ignition cavity of the model rocket engine in preparation for launch.

12 Claims, 2 Drawing Sheets

U.S. PATENT DOCUMENTS

| | | | |
|---|---|---|---|
| 3,332,353 | 7/1967 | Burkhardt et al. | 102/202 |
| 3,363,559 | 1/1968 | Estes | 102/28 |
| 3,422,763 | 1/1969 | Wait | 102/202 |
| 3,503,333 | 3/1970 | Estes | 102/28 |
| 3,695,179 | 10/1972 | Rainone et al. | 102/202.11 |
| 3,974,819 | 8/1976 | Held | 124/17 |
| 4,002,882 | 1/1977 | McCuthchen | 219/499 |
| 4,355,577 | 10/1982 | Ady et al. | 102/378 |
| 4,405,890 | 9/1983 | Hicks, Jr. | 320/2 |
| 4,573,316 | 3/1986 | Carrier et al. | 60/39.823 |
| 4,655,137 | 4/1987 | Boltz | 102/202 |
| 4,751,881 | 6/1988 | Fauconnier et al. | 102/202 |
| 4,799,428 | 1/1989 | Yunan | 102/275.12 |
| 4,930,393 | 6/1990 | Castro, Jr. | 89/1.8 |
| 5,004,441 | 4/1991 | Hammerly et al. | 446/211 |

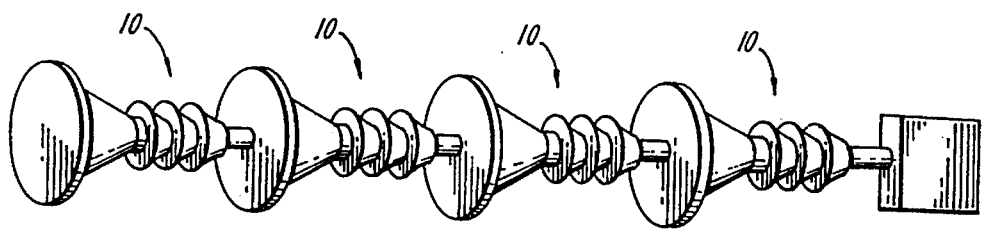
FIG. 1
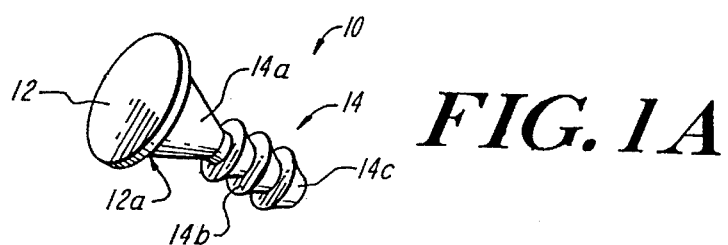
FIG. 1A
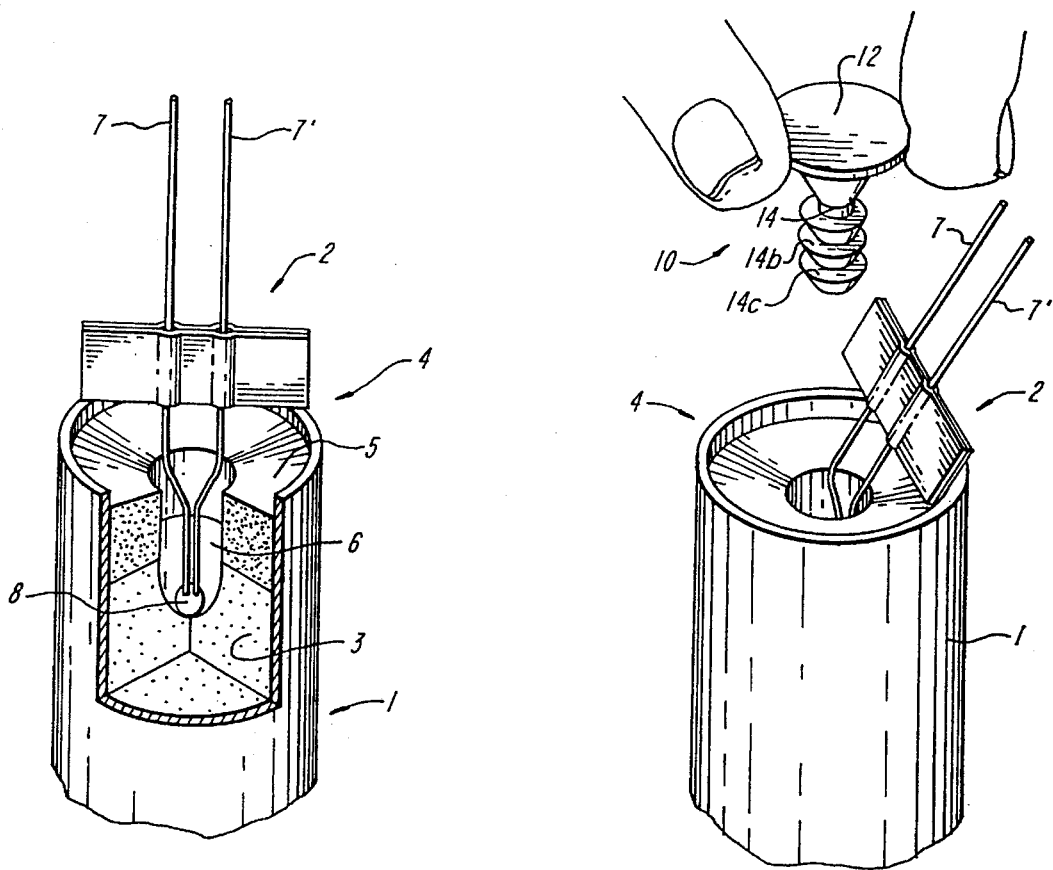
FIG. 2A
FIG. 2B

IGNITER HOLDER

REFERENCE TO RELATED APPLICATIONS

This application is a continuation-in-part of U.S. Ser. No. 07/973,769, filed Nov. 9, 1992, now abandoned, entitled "High Reliability Model Rocket Engine Igniter System", which is a continuation-in-part of U.S. Ser. No. 07/858,109, filed Mar. 26, 1992, now abandoned, entitled "Ignition Fuse Holder", the specifications of which are incorporated herein by reference.

BACKGROUND OF THE INVENTION

This invention relates generally to model rockets. More particularly, it relates to an apparatus for securing an igniter in the engine of a model rocket.

Building and launching model rockets has been popular with children and adults for years. Safety has been and remains a concern since some hazards exist when rockets are not properly handled. To minimize these hazards, standardized pyropulsive model rocket engines have been developed and are available to the public. These engines are generally cylindrical units containing preloaded, carefully prepared amounts of a pyrogenic propellant which burns at a controlled rate to produce high velocity propulsion and sufficient thrust to launch the rocket into the air.

For safety reasons, it has become common practice to ignite model rocket engines by remote means, such as through an electrical ignition system. One such system employs an electric igniter having one or more lead wires connected to a high resistance heating section, and may also include a coating of a pyrogenic material on the heating section to aid ignition. The lead wires are connected to an electrical source and, when electricity, typically from a storage battery, is applied to the high-resistance heating section, the heated section ignites the propellant and the rocket launches. Should the lead wires come in contact with each other or with a part of the launch pad, a short circuit can occur, and ignition not take place.

It is therefore an object of this invention to provide an igniter holder which secures the igniter in the ignition cavity of a model rocket engine and which separates the lead wires of the igniter to avoid electrical malfunction.

It is further an object to provide a reusable igniter holder which is easily inserted into the model rocket engine and ejected upon ignition, and which is inexpensive to manufacture.

Other objects of the invention will be obvious from the remainder of the specification and will appear hereafter.

SUMMARY OF THE INVENTION

An igniter holder according to the invention is structured for use with a pyropulsive model rocket engine ignited by an electrical igniter of the type having lead wires connected by a heating section with increased electrical resistance. Model rocket engines of this type include an ignition cavity in the discharge end of the engine into which the igniter is inserted.

The igniter holder is an article structured for securing an igniter in the ignition cavity of the model rocket engine in preparation for launch. The igniter holder has structure for inserting and, alternatively, removing the igniter holder from the ignition cavity of a model rocket engine. Projecting from this is structure for temporarily securing the igniter in the ignition cavity prior to launching the rocket.

A preferred embodiment of the igniter holder has a disk-like head from which a stem projects. The disk-like head is perpendicular to the axis of the stem and provides structure for inserting and removing the holder from the ignition cavity of a model rocket engine. The stem separates the lead wires of the igniter and secures the igniter in the cavity. The stem is of a length sufficient to keep the lead wires apart, and yet avoid damage to the heating end of the igniter. The stem of the igniter holder preferably includes a circumferentially ribbed holding section that seats with a slight interference fit in the ignition cavity of the engine.

The igniter holder stem can also have a frusto-conical section, the base of which joins to the head of the holder. The holding section is at the narrow end, and the stem can terminate with a rounded or blunt end.

Because the igniter holder is manually inserted into the cavity under minimal pressure and subsequently removed by the pressure of the thrust of the engine, the holder is preferably made of a relatively rigid, non-flammable material. It is designed for reuse, although it preferably is sufficiently inexpensive to manufacture and to replace in the event it becomes lost during launch.

A preferred non-flammable material is preferably a synthetic polymeric material such as polyethylene, injection-molded vinyl, a polyurethane polymer, or other resilient, flexible elastomeric materials capable of being injection-molded. Polypropylene has been found to be an especially advantageous material.

BRIEF DESCRIPTION OF THE DRAWINGS

FIGS. 1 and 1A are lateral perspective views of igniter holders exemplary of this invention.

FIG. 2A is a perspective view, partially cut away, and FIG. 2B is a perspective view, not cut away, of a pyropulsive model rocket engine showing a igniter inserted into the ignition cavity and the igniter holder positioned for insertion in the engine.

DETAILED DESCRIPTION

Figure 3:
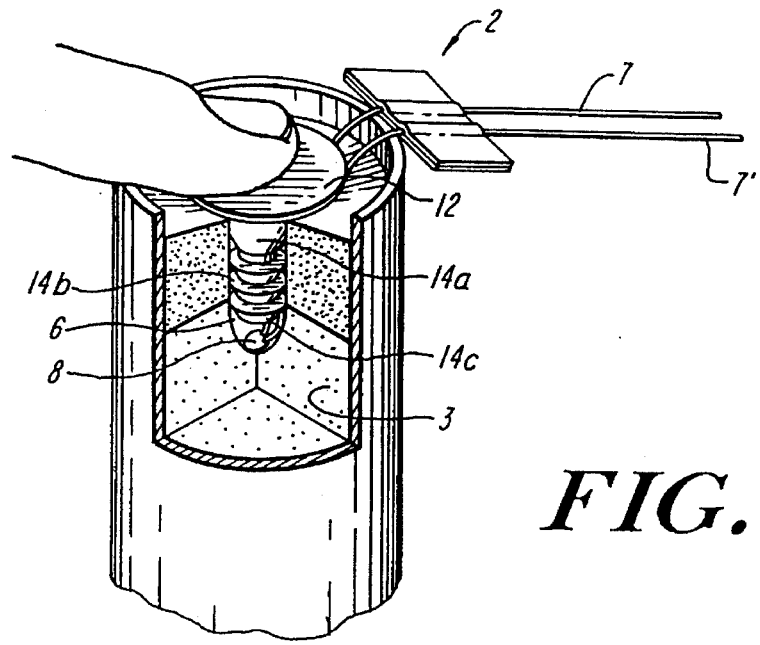
FIG. 3 is a perspective view, partially cut away, of the igniter holder assembled in the model rocket engine.

As shown in the various Figures, wherein corresponding parts bear corresponding reference numerals, a standard model rocket engine 1 of the solid propellant type has a high thrust charge of solid propellant grain 3 separated from the discharge end 4 of the engine 1 by a non-flammable material 5, such as clay. There is a central bore or ignition cavity 6 through the non-flammable material 5 and into the solid propellant grain 3. This central bore provides for easy ignition and a relatively large burning area, resulting in fast consumption of fuel and giving high initial thrust for launch.

In preparation for launch, an igniter 2 is inserted into the central bore 6, and lead wires 7, 7' are secured to a remote power source, such as a battery. When the circuit is closed, the electrical power heats the thin, high-resistance heating section 8 sufficiently to ignite the solid fuel and to launch the rocket. To ensure a reliable and safe launch, the igniter 2 is temporarily fixed in the central bore 6 to ensure that it contacts the pyrogenic material. In addition, precautions are taken to prevent the parts of the igniter 2 from coming in contact with each other, or with the launch pad, as this can cause an electrical malfunction, typically a short circuit.

As shown in FIGS. 1 and 1A, the igniter holder 10 according to the present invention is a substantially rigid, non-flammable article structured for insertion into the central bore 6 of the model rocket engine 1, once the igniter 2 is in place. Because the igniter 2 is relatively fragile, particularly the high-resistance section 8, the igniter holder 10 preferably supports the igniter 2 without damaging it. The invention provides igniter holder structured with a head 12 for alternatively inserting and removing the igniter holder 10 from the ignition cavity 6 using minimal force, and structured with a stem 14.

The stem retains the holder seated in the ignition cavity 6, at least until ignition. Further, it supports the igniter in the ignition cavity 2 with the heating section 8 disposed to ignite the propellant in the engine. A further function of the stem is to separate the igniter wires 7, 7' within the ignition cavity 6, to avoid an electrical short circuit.

The igniter holder 10 has a one-piece construction, and typically is molded in multiple groups, as FIG. 1 shows. The illustrated holder has, as FIGS. 1A, 2B an 3 show, a disk-like head 12 dimensioned to match the size of the rocket engine 1 with which it is used and for manipulation by one or two fingers, as shown. The underside 12a of the head presents an annular thrust surface to the rocket engine, so that the ignition thrust of the engine ejects the holder 10, together with the igniter 2, from the ignition cavity 6.

The stem 14 extends transversely from the center of the head. The axial length of the stem matches the depth of the engine cavity 6, so that the holder places the igniter heating section 8 in abutment with the propellant at the base of that cavity. The illustrated stem 14 has, in axial succession, a frusto-conical section 14a that connects at its base to the head, a circumferentially ribbed holding section 14b, and a positioning end 14c. The ribs of the holding section engage the walls of the engine cavity 6 with a slight interference fit, and preferably are beveled barb-like structures for easy insertion and to resist inadvertent removal, until ignition. The positioning end 14c of the stem has a blunt, typically rounded, profile. This specific structure of the holder 10 is deemed illustrative for providing the multiple desired functions of the holder 10.

The securing function of the igniter holder 10 is important both for the novice and for more experienced rocketeers. In the hands of the novice, the igniter holder 10 ensures reliable ignition and improved safety. More experienced rocketeers commonly experiment with other engine configurations, such as clusters which use more than one engine to launch a larger rocket. Reliable, simultaneous ignition is critical in such an arrangement so that all engines ignite substantially simultaneously. If the ignitor is not installed in each engine correctly, near-simultaneous ignition may not occur. If the rocket then launches at all, the angle of launch may be hazardous to observers and passers-by.

The material from which the igniter holder 10 is made is to be flexible enough not to damage the relatively thin wires of the igniter 2 but rigid enough to support the igniter 2 in the ignition cavity 6. The material is also to be non-flammable. Suitable materials include synthetic polymers such as polyethylene, injection-molded vinyl, polyurethane polymer, polypropylene, or other resilient, flexible elastomeric materials which are capable of being injection-molded, and is preferably polypropylene.

Figure 4:
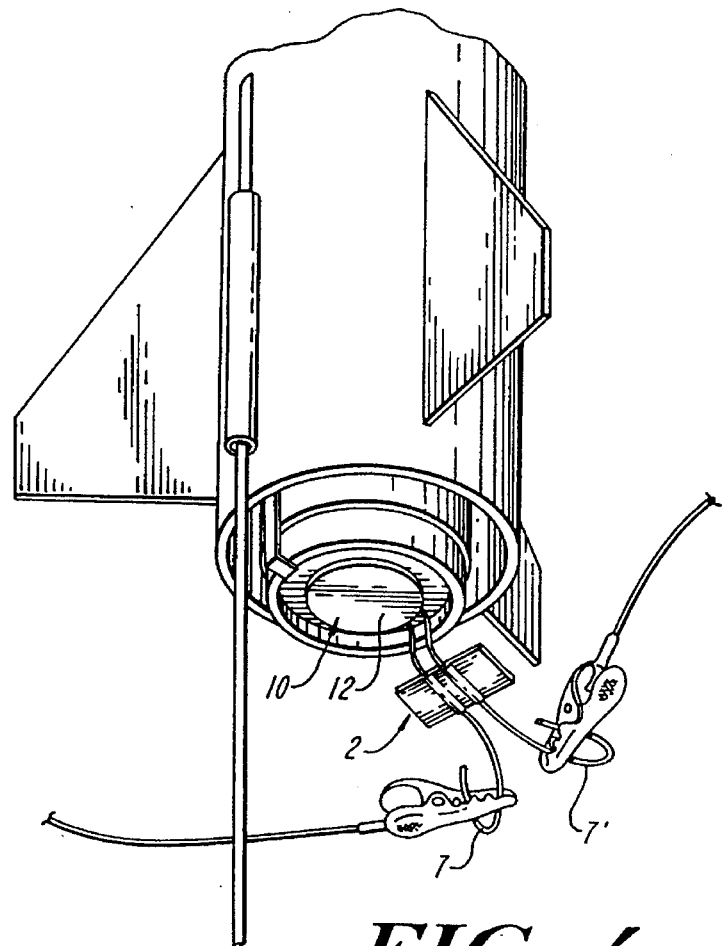
FIG. 4 is a perspective view of a model rocket, fitted with an igniter holder, and ready for launch.

One manner of using the igniter holder 10 is to insert it into the engine ignition cavity 6, as shown in FIGS. 2B and 3, after the igniter 2 is placed in the cavity, as shown in FIG. 2A. The lead wires 7, 7' secured to the igniter, are connected to the ignition battery (not shown) or other electrical power source, such as by the microclips shown in FIG. 4. The rocket is ready for launch.

It will thus be seen that the objects set forth above, including those made apparent from the preceding description, are efficiently attained. Since certain changes may be made in the article of the invention without departing from the scope of the invention, it is intended that all matter contained in the above description or shown in the accompanying drawings be interpreted as illustrative and not limiting. The following claims are intended to cover all of the generic and specific features of the invention herein described, and all equivalents thereto.

Having described the invention, what is claimed as new and secured by Letters Patent is:

1. An igniter holder for a pyropulsive model rocket engine having an ignition cavity, and being arranged for ignition by an electrical igniter having lead wires connected to an electrical resistance section, said igniter holder comprising a substantially rigid article having a one piece construction, with a disk-like head and a stem projecting from a central portion of said head, said stem having an axis substantially perpendicular to a plane of said head and terminating in a positioning end, adapted for positioning the electrical igniter in the ignition cavity, wherein said igniter holder, when inserted into the ignition cavity of the model rocket engine fitted with the electrical igniter, temporarily secures the igniter in the ignition cavity, and wherein said igniter holder is adapted to be expelled from the model rocket engine following said ignition.

2. The igniter holder of claim 1 wherein said disk-like head of said igniter holder defines a manually engageable surface for alternatively receiving an installation force and for extracting the igniter holder from the engine.

3. An igniter holder according to claim 1 wherein said stem includes a frustoconical tapered section joining said head and said stem.

4. An igniter holder according to claim 1 wherein said stem comprises a ribbed section adapted for temporarily securing said igniter holder in the ignition cavity.

5. An igniter holder according to claim 4 wherein said ribbed section is circumferential about said stem.

6. The igniter holder according to claim 1 wherein said igniter holder is made of a substantially non-flammable material.

7. The igniter holder according to claim 6 wherein said substantially non-flammable material is a synthetic polymer selected from the group consisting of polyethylene, polyurethane polymer, injection-molded vinyl, and polypropylene.

8. An igniter holder for a pyropulsive model rocket engine having on ignition cavity and ignited by an electrical igniter having an electrical resistance heating section, said igniter holder comprising means for alternatively inserting and removing said igniter holder relative to the model rocket engine, and means for separating the lead wires of the igniter and for temporarily securing the igniter in the ignition cavity of the model rocket engine, wherein said igniter holder is made of a substantially non-flammable material, and wherein said igniter holder, when inserted into the ignition cavity of the model rocket engine fitted with the electrical igniter, temporarily secures the igniter in the ignition cavity.

9. An igniter holder according to claim 8 wherein said means for alternatively inserting and removing said igniter holder comprises a disk-like head.

10. An igniter holder according to claim 8 wherein said means for securing the igniter in the ignition cavity comprises a stem.

11. An igniter holder for a solid propellant model rocket engine fitted with an igniter, wherein the engine has a solid propellant grain section defining an igniter cavity, said igniter holder comprising a substantially rigid article having an axis, and having a flat, disk-like end substantially perpendicular to said axis, and a stem projecting from the disk-like end along said axis, and wherein said stem terminates in a positioning end, said stem of said igniter holder being structured for insertion into the igniter cavity of the model rocket engine fitted with the igniter, such that said positioning end and said stem temporarily secure the igniter in said igniter cavity of the engine with a slight interference fit between said stem of said igniter holder and the igniter cavity of the model rocket engine, and said igniter holder being further structured to be inserted after the igniter is inserted and to be expelled from the engine following ignition.

12. The igniter holder of claim 11 wherein said stem is structured to provide said interference fit between at least said positioning end of said stem and said igniter cavity.

* * * * *